United States Patent [19]

Moller

[11] Patent Number: 5,684,831
[45] Date of Patent: Nov. 4, 1997

[54] DATA BUS WITH NOISE IMMUNITY

[75] Inventor: David Dale Moller, Kokomo, Ind.

[73] Assignee: Delco Electronics Corp., Kokomo, Ind.

[21] Appl. No.: 406,229

[22] Filed: Mar. 17, 1995

[51] Int. Cl.⁶ .................................................. H04B 3/00
[52] U.S. Cl. .................................... 375/257; 375/275
[58] Field of Search .............................. 375/257, 297, 375/275, 219; 307/39; 340/621, 825.5, 825.06

[56] References Cited

U.S. PATENT DOCUMENTS

| | | | |
|---|---|---|---|
| 3,868,519 | 2/1975 | Green | 375/257 |
| 5,041,793 | 8/1991 | Galius | 375/297 |
| 5,321,724 | 5/1994 | Long et al. | 375/257 |
| 5,355,390 | 10/1994 | Yamamoto et al. | 375/257 |
| 5,513,218 | 5/1996 | Moller | 375/257 |

*Primary Examiner*—Stephen Chin
*Assistant Examiner*—Joseph Roundtree
*Attorney, Agent, or Firm*—Mark A. Navarre

[57] ABSTRACT

A class 2 or UART data communication bus is subject to disruption by induce high frequency currents because of an impedance mismatch between a passive pull-up or pull-down resistor and a lower impedance active current sourcing or sinking stage. An impedance reduction circuit across the passive resistor balances the impedance in the presence of high frequency noise. The impedance reduction circuit is operative when it senses a bus line voltage slew rate greater than that caused by data pulses and a voltage change greater than one diode drop.

10 Claims, 2 Drawing Sheets

DATA BUS WITH NOISE IMMUNITY

FIELD OF THE INVENTION

This invention relates to serial data communication in a motor vehicle and particularly to means for preventing or minimizing the effects of noise on data transmission.

BACKGROUND OF THE INVENTION

Automotive vehicles often have digital control devices in various parts of the vehicle and information must be relayed from one to another. Digital data communication is generally used for this purpose. A Class 2 bus or a UART (universal asynchronous receiver/transmitter) bus is useful for the data communication. Such buses employ a transceiver coupled to several remote communication modules by a common line comprising a single wire carrying encoded voltage pulses. Typically each pulse comprises a voltage waveform which swings above and below a threshold, say, 2.5 volts, and a receiving module recognizes each pulse by detecting the voltage crossings of that threshold.

While digital signals are commonly expressed by square wave pulses, the fast rise and fall times give rise to electromagnetic interference (EMI) which is especially undesirable in the communication buses due to the opportunity to emit radiation from the extended line. To avoid such radiation emission each transmitter module filters or shapes the square wave data input pulses to assure that for the corresponding transmitted pulses the rise and fall times are slew rate limited and wave corners are rounded rather than sharp, thereby avoiding rapid changes of signal current.

Because an automotive vehicle is a very noisy radiation environment, EMI emitted from other sources impacts the operation of the data buses. Both the Class 2 bus and the UART bus are single ended, bi-directional transceivers having an active source or sink for imposing a voltage pulse on the line. For the UART, the bus is coupled to a supply voltage through a large pull-up resistor and the transceiver momentarily connects the line to ground for each pulse. In the case of the Class 2 bus, a large pull-down resistor couples the bus to ground and the transceiver connects the line to the power supply for each pulse. In each case the impedance of the transceiver source or sink is much smaller than the resistor. Due to the asymmetry of impedances, radiation noise induced on the bus pulls the average dc level of the bus to the supply voltage via the low impedance active source or to ground potential via the low impedance active sink. This disables the bus during the noise interval since the transceiver is then unable to impose the necessary voltage pulses on the common line.

SUMMARY OF THE INVENTION

It is therefore an object of the invention to immunize UART and Class 2 communication buses against EMI. Another object is to transmit pulses on a communication bus without disruption by electromagnetic interference.

The basic transmitting circuit of a module comprises a waveshaping circuit which receives square wave data input pulses and filters them to yield pulses having sloped rise and fall times and rounded corners, and an output circuit comprising a voltage follower. Thus for each square wave input there will be a pulse output to a common line, the pulse being shaped to minimize radiated emissions. In particular, the rising and falling pulse edges are limited to a maximum slew rate.

For the Class 2 bus, the voltage follower is an active source such as a transistor coupling the bus to a supply voltage of about 5 to 7 volts when the source is enabled, while a pull-down resistor pulls the bus to ground when the source is disabled, thereby imposing a variable voltage signal on the common line. Typically the signal will represent one logic state above 2.5 volts and another below 2.5 volts. The impedance of the source, when disabled, is much lower than that of the pull-down resistor. In that condition when high frequency EMI signals are injected onto the line the average dc level will drift toward the lower impedance, or the supply voltage. For the UART bus, the inverse condition prevails. Since the active driver couples the bus to ground and the high resistance couples the bus to supply voltage, the EMI causes the line to drift to ground. In either case the voltage follower is unable to respond to input pulses to produce a detectable signal which swings about the 2.5 volt level.

The impedance asymmetry of the bus is the feature which allows the EMI to bias the dc level to an inoperative condition. A smaller pull-up or pull-down resistor cannot be used because other modules must be able to transmit on the bus; such a small resistor would cause remote modules to go into short circuit limiting when they are trying to transmit. The solution is to include in the transceiver output a high frequency ac impedance reduction stage which effectively places a low impedance (as seen by the high frequency EMI) across the pull-up or pull-down resistor to match the low impedance of the active driver. Then the EMI will not distort the dc voltage level.

The impedance reduction stage detects when the high frequency EMI is present and then passes current around the pull-up or pull-down resistor. The impedance reduction circuit responds when two conditions are met: a high frequency is detected as evidenced by a high slew rate, and the line voltage departs from the input voltage of the voltage follower by a diode drop. The slew rate threshold is selected to be above the maximum slew rate of the data pulse edges so that data transmission does not trigger the impedance reduction.

For the UART device, the signal slew rate is detected by a current source in series with a capacitor across the input and output lines, and a first transistor having its emitter and base coupled across the current source. If the capacitor current due to slew rate exceeds the current source value, the transistor is able to conduct provided that the output line is a diode drop below the input line voltage. Additional transistor stages controlled by the first transistor meter current to the output line to sustain the average dc bus voltage at a high level. The high frequency ripples about this high level and does not impair data transmissions. For the Class 2 device, the impedance reduction circuit is the mirror image of the one just described.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a solution to the effect of noise on data communication buses which was developed for use on UART and Class 2 buses. An implementation is disclosed for each application. It is expected that a similar solution will apply to other bus configurations.

Figure 1:
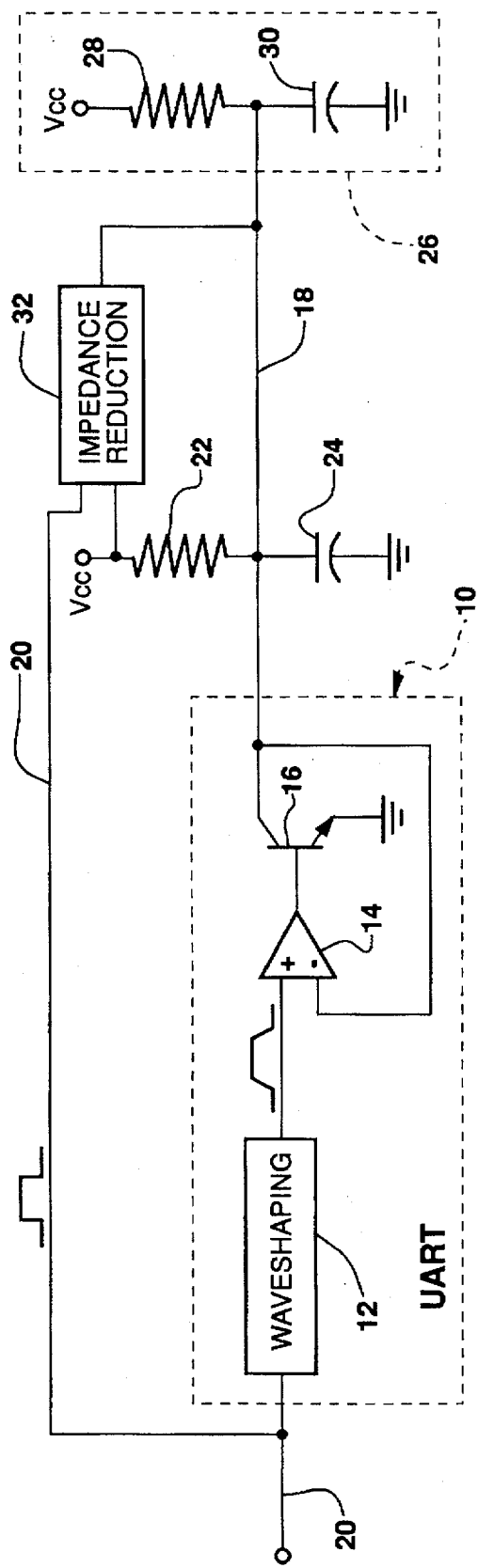
FIG. 1 is a schematic diagram of a UART bus with an impedance reduction circuit according to the invention.

A UART bus, shown in FIG. 1, comprises a transceiver 10 having waveshaping circuit 12, a unity gain buffer amplifier 14 having its positive input terminal connected to the waveshaping circuit output and its output connected to the base of a transistor 16. The transistor emitter is connected to ground and the collector comprises the transceiver output which is connected to the negative input of the amplifier 14 as well as to the common bus line 18. An input line 20 to the waveshaping circuit 12 carries square wave pulses representing data to be transmitted and the waveshaping circuit 12 imposes a slew rate of about 0.25 volts/μsec on the pulse edges to avoid abrupt current changes which might give rise to radio frequency emissions. The buffer amplifier 14 and the transistor 16 comprise a voltage follower circuit for copying each pulse onto the common line 18. A pull-up resistor 22 couples the common line 18 to a supply voltage $V_{cc}$ and a capacitor 24 couples the line 18 to ground. A remote communication module 26 on the bus represents one of many such modules and comprises a resistor 28 coupled from $V_{cc}$ to the line 18 and a capacitor 30 coupled to ground. The pull-up resistor 22 has a value on the order of 910 ohms, whereas the transceiver output has an apparent impedance to ground of about 125 ohms due to its short circuit limit. In the circuit thus far described, this mismatch of impedances would allow current noise induced in the bus to pull the bus voltage to ground, defeating attempts of the transceiver 10 to transmit data pulses. This condition is remedied by a high frequency, ac source impedance reduction circuit 32 connected across the pull-up resistor 22 and connected to the input line 20.

Figure 2:
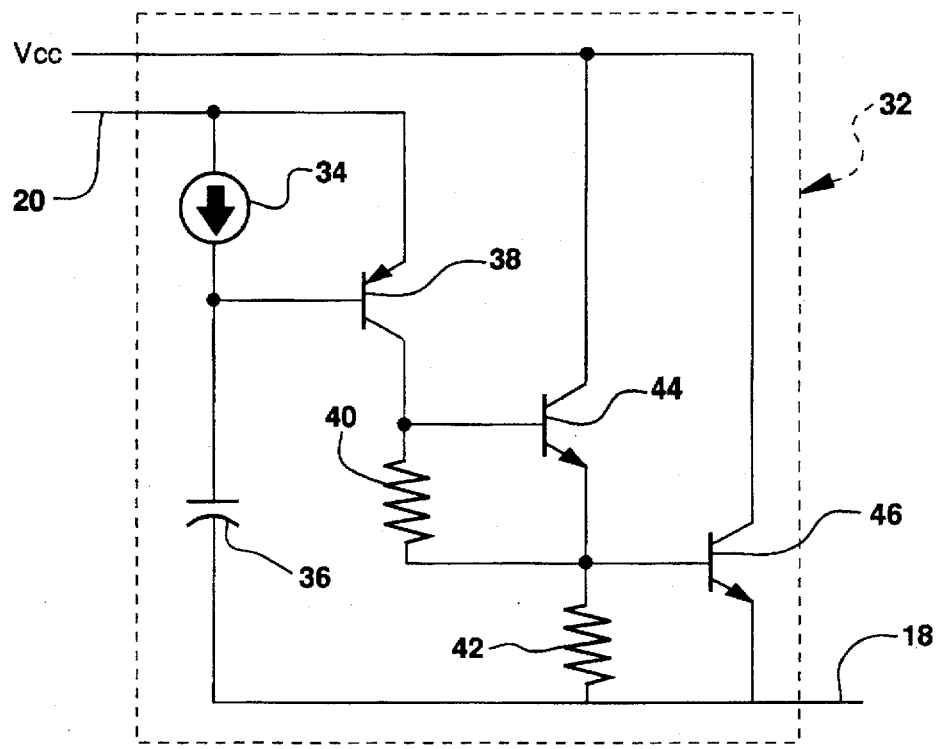
FIG. 2 is a schematic diagram of the impedance reduction circuit of FIG. 1.

As shown in FIG. 2, the impedance reduction circuit 32 comprises a current source 34 and a capacitor 36 serially connected between the input line 20 and the common line 18, a pnp transistor 38 having its emitter and base coupled across the current source 34 and its collector is connected to line 18 via a serial pair of resistors 40 and 42 which form part of an output stage. The output stage further includes a first npn transistor 44 having its collector connected to $V_{cc}$ and its emitter connected to the junction of the resistors 40 and 42 as well as to the base of a second npn transistor 46. The latter transistor is coupled between $V_{cc}$ and common line 18. The operation of this circuit 32 is to source current into the line 18 when the high frequency noise is present. The noise is identified by a high voltage slew rate dv/dt on line 18 which is greater than the slew rate of the data pulse edges. The capacitor current i=C*dv/dt, where C is the capacitance, and the current i is supplied by the current source provided that dr/dr is small. For large slew rates the current i exceeds the source capability so that current is drawn from the transistor 38 base to turn the transistor on, provided that the base voltage is one base-emitter drop (one diode drop) below the input line 20 voltage. The conduction of transistor 38 turns on the other transistors 44 and 46 so that current is sourced to the line 18. The three transistor gains assure that sufficient current is supplied to overcome the tendency of the current injected by noise to pull the voltage down.

In effect the impedance reduction circuit 32 compensates for the impedance mismatch. The resulting impedance symmetry causes the common line voltage to ripple around an average dc bus voltage of 5.5 volts. Since the receiver voltage threshold is 2.5 volts, this results in valid data transmission during the noise exposure.

It should be noted that two conditions must be met to turn on the impedance reduction circuit 32, thereby assuring its operation only when the high frequency noise is present. First, the voltage on common line 18 must experience a slew rate greater than that produced by the waveshaped data pulses; the critical slew rate (dv/dt=0.3 volts/μsec) is selected by the value C of the capacitor 36 and the current limit of the current source 34. Second, the common line voltage must go one diode drop below the input voltage; this adds hysteresis to the response to prevent the circuit 32 from sourcing current during small, negative going, output noise perturbations.

Figure 3:
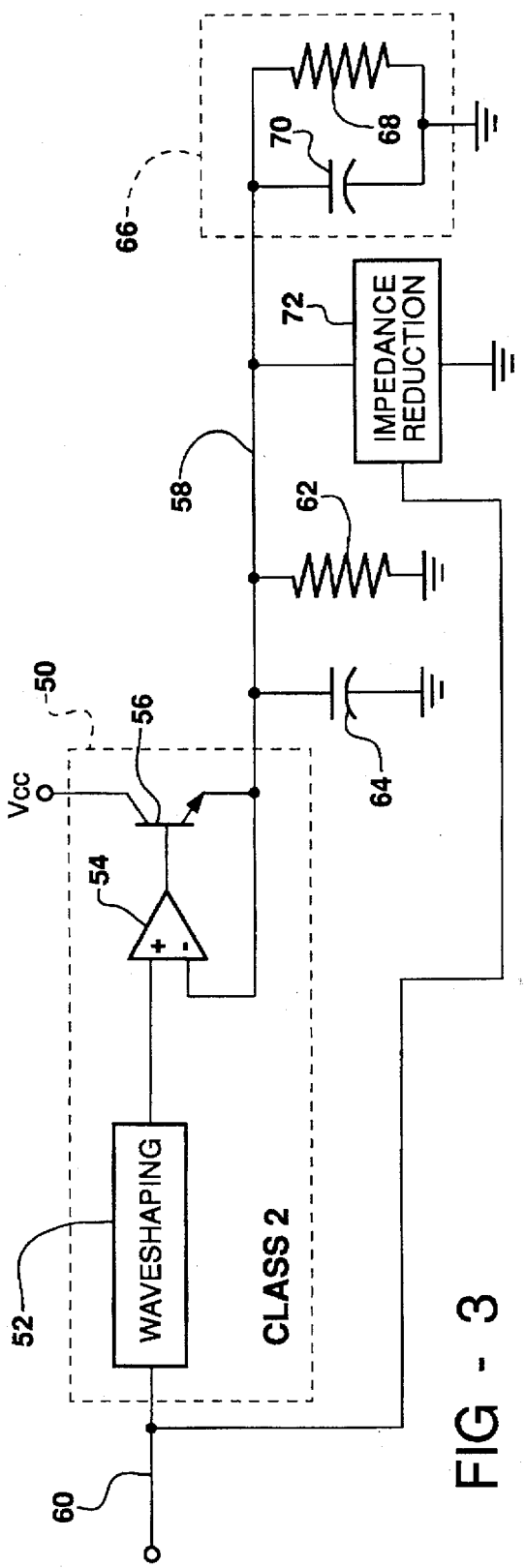
FIG. 3 is a schematic diagram of a class 2 bus with an impedance reduction circuit according to the invention.

A class 2 bus, shown in FIG. 3, comprises a transceiver 50 having waveshaping circuit 52, a unity gain buffer amplifier 54 having its positive input terminal connected to the waveshaping circuit output and its output connected to the base of a transistor 56 which is coupled between $V_{cc}$ and common bus line 58. The negative input of the amplifier 54 is also connected to the common bus line 58. An input line 60 to the waveshaping circuit 52 carries square wave pulses representing data to be transmitted and the waveshaping circuit 52 imposes a slew rate of about 0.25 volts/μsec on the pulse edges to avoid abrupt current changes which might Give rise to radio frequency emissions. The buffer amplifier 54 and the transistor 56 comprise a voltage follower circuit for copying each pulse onto the common line 58. A pull-down resistor 62 and a capacitor 64 couple the common line 58 to ground. A remote communication module 66 on the bus represents one of many such modules and comprises a resistor 68 and a capacitor 70 coupled between line 58 and ground. The pull-down resistor 62 has a value on the order of 1500 ohms, whereas the transceiver output has a much smaller apparent impedance to ground due to its short circuit limit. In the circuit thus far described, this mismatch of impedances would allow current noise induced in the bus to pull the bus voltage toward $V_{cc}$, defeating attempts of the transceiver 50 to transmit data pulses. This condition is remedied by a high frequency, ac source impedance reduction circuit 72 connected across the pull-down resistor 62 and connected to the input line 52.

Figure 4:
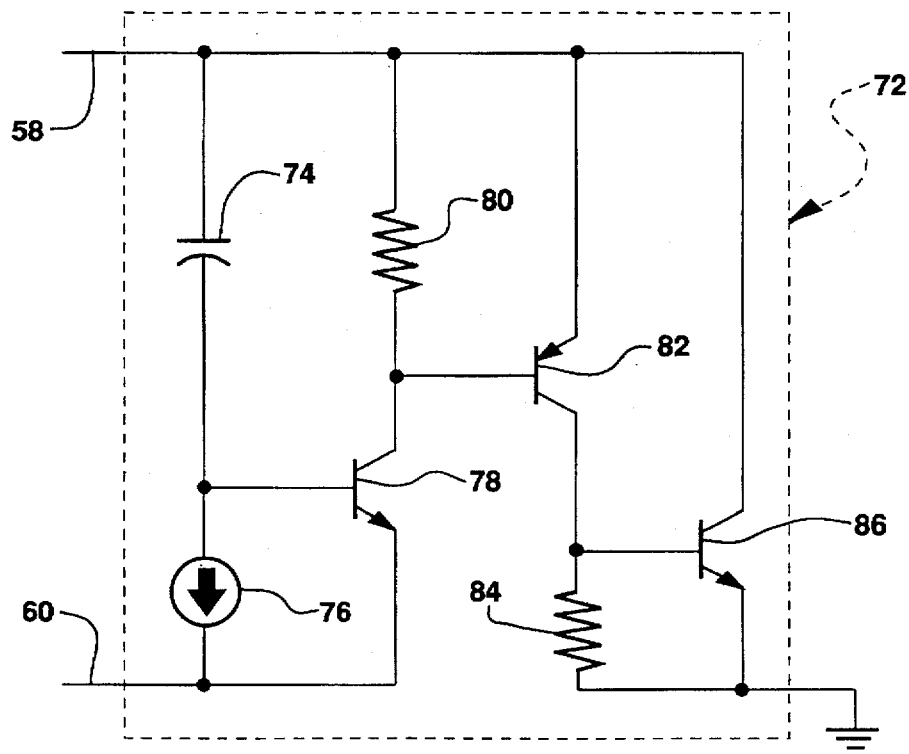
FIG. 4 is a schematic diagram of the impedance reduction circuit of FIG. 3.

The impedance reduction circuit 72, as shown in FIG. 4, is a mirror image of the circuit of FIG. 2 and operates in substantially the same way to balance the impedances between the common line 58 and $V_{cc}$ and ground, respectively. A capacitor 74 and a current source 76 are serially connected between common line 58 and the input line 60. An npn transistor 78 has its base connected to the junction of the capacitor 74 and the current source 76, its collector coupled to line 58 via a resistor 80 and its emitter is grounded. A transistor output stage includes a pnp transistor 82 having its base connected to the collector of transistor 78, its emitter connected to common line 58 and its collector coupled through resistor 84 to ground, and an npn transistor 86 connected across line 58 and ground with its base coupled to the collector of transistor 82. The operation of the impedance reduction circuit 72 is essentially like the impedance reduction circuit 32 and need not be further described here.

It will thus be seen that the enhanced data communication circuit attains impedance balancing in the presence of high frequency noise to overcome the debilitating effects of noise to allow data communication to proceed without impediment.

The embodiments of the invention in which an exclusive property or privilege is claimed are defined as follows:

1. In a serial communication system having a common line carrying data pulses among a plurality of communication modules, wherein the system is subject to high frequency noise, a transmitting module comprising:

waveshaping means for generating data pulses having a limited slew rate;

an output circuit including a bias circuit coupling the common line through a high impedance to a first source voltage and a voltage follower circuit connected to said waveshaping means and coupling the common line through a low impedance to a second source voltage; and noise immunization means comprising an ac impedance circuit connected across the high impedance for reducing the ac impedance to high frequency noise, whereby high frequency noise is prevented from altering the dc level of the common line sufficiently to impair data transmission.

2. The invention as defined in claim 1 wherein:

the high impedance comprises a passive resistance; and the ac impedance circuit is connected across the passive resistance and includes transistor means responsive to high frequency noise for conducting high frequency current between the first source and the common line to sustain the dc level of the common line.

3. The invention as defined in claim 2 wherein the ac impedance means includes discriminating means for effecting conduction of the transistor means by responding only to high frequency noise signals and not to the data pulses.

4. The invention as defined in claim 2 wherein the ac impedance means includes discriminating means for effecting conduction of the transistor means for signals having a slew rate greater then that of the data pulses, whereby the data pulses do not invoke the ac impedance circuit.

5. In a serial communication system having a common line carrying data pulses among a plurality of communication modules, wherein the system is subject to high frequency noise, a transmitting module comprising:

transmitter means supplied by first and second voltage sources for coupling data pulses from an input line to the common line;

a passive resistance coupled between the first voltage source and the common line;

an active driver circuit coupled between the second voltage source and the common line, said active driver circuit having a substantially lower impedance than the passive resistance; and an active impedance circuit coupled between the first voltage source and the common line in parallel with the passive resistance and responsive to high frequency noise on the common line for providing a reduced impedance path for the noise, thereby minimizing the effect of the noise on the dc level of the common line.

6. The invention as defined in claim 5 wherein the first and second voltage sources are a supply voltage and ground voltage respectively.

7. The invention as defined in claim 5 wherein the first and second voltage sources are a ground voltage and a supply voltage respectively.

8. The invention as defined in claim 5 wherein the active impedance circuit includes:

a transistor connected between the first voltage source and the common line; and noise detection means responsive to a predetermined voltage between the input for activating the transistor to provide a low impedance path between the first voltage source and the common line when the rate of change in voltage between the input line and the common line exceeds a predetermined rate of change.

9. The invention as defined in claim 8 wherein the noise detection means comprises:

a capacitive circuit for detecting voltage slew rates above a threshold.

10. The invention as in claim 5 wherein the active impedance circuit includes:

a capacitor and a current source serially connected between the input line and the common line;

a transistor having its base connected to a junction between the capacitor and the current source so that the transistor conducts when the capacitor current due to high frequency noise on the common line exceeds the current sourcing capability of the current source and the difference in input line and common line voltage is sufficient to bias the transistor on; and a transistor output stage connected between the first voltage source and the common line and controlled by the transistor for providing a low impedance path between the first voltage source and the common line when the transistor conducts.

* * * * *